United States Patent [19]
Cicchiello

[11] 3,887,856
[45] June 3, 1975

[54] PUSH-BUTTON-OPERATED MOTOR SPEED CONTROL CIRCUIT

[75] Inventor: Frank N. Cicchiello, Norristown, Pa.

[73] Assignee: Burroughs Corporation, Detroit, Mich.

[22] Filed: Oct. 2, 1973

[21] Appl. No.: 402,706

Related U.S. Application Data

[60] Continuation of Ser. No. 256,670, May 25, 1972, which is a division of Ser. No. 116,395, Feb. 18, 1971.

[52] U.S. Cl. .................. 318/345; 318/391; 318/416
[51] Int. Cl. .............................................. H02p 5/12
[58] Field of Search .......... 318/305, 345, 391, 416; 307/238, 251

[56] References Cited
UNITED STATES PATENTS

| | | | |
|---|---|---|---|
| 3,348,113 | 10/1967 | Vichr | 318/305 |
| 3,373,295 | 3/1968 | Lambert | 307/238 |
| 3,617,847 | 11/1971 | Powell | 318/345 |

Primary Examiner—G. Z. Rubinson
Attorney, Agent, or Firm—Leonard C. Brenner; C. Paul Padgett, Jr.; William B. Penn

[57] ABSTRACT

A push-button-operated motor speed control circuit for use in a bidirectional speed control system for a film drive motor. The push buttons control the operation of switches for variably charging or discharging a storage capacitor which supplies a biasing potential to the gate of a field-effect transistor. The variable level of charge on the capacitor determines the amount of current passed by the FET, and variations in this current may then be used to vary the running speed of the film drive motor. An infinite number of speeds between predetermined upper and lower limits is made possible by the infinite number of possible voltage levels on the storage capacitor. The level of voltage stored on the capacitor is determined by the length of time that a push button is depressed, and both the steady state value of voltage on the capacitor and the steady state value of the motor speed are those values existing at the instant that the push button is released.

9 Claims, 5 Drawing Figures

INVENTOR
FRANK N. CICCHIELLO

BY *Charles P. Padgett Jr.*
AGENT

FIG. 2.

INVENTOR
FRANK N. CICCHIELLO
BY Charles P. Padgett Jr.
AGENT

FIG. 4.

INVENTOR
FRANK N. CICCHIELLO

BY Charles P. Padgett Jr.
AGENT 3,887,856

PUSH-BUTTON-OPERATED MOTOR SPEED CONTROL CIRCUIT

BACKGROUND OF THE INVENTION

This is a continuation of application Ser. No. 256,670 filed May 25, 1972, which is a division of application Ser. No. 116,395 filed Feb. 18, 1971.

This invention relates generally to a push-button-operated motor speed control circuit, and more specifically to a control circuit for use in a bidirectional motor speed control system wherein controlled variations in the level of an output signal from the circuit may be used to vary the operating speed of a motor and wherein variations in the level of an output signal are directly related to the duration of push button depressions.

Push-button-operated motor speed control systems of the past have usually employed a motor which could only be operated at discrete levels of motor speed. Many of these systems utilize a plurality of push buttons, usually one push button for each discrete level of speed, or a multiple switch having one switch position for each discrete level of speed, but intermediate values of speed between these discrete levels are not obtainable.

A few variable speed systems are available which employ a variable resistor or potentiometer for varying the motor speed within relatively narrow limits or a push button whose stem is the core of the variable transformer. These systems, however, are usually somewhat bulky and cumbersome, and are often unreliable and difficult to service and repair. The degree of control possible and the inability to make fine speed adjustments over relatively wide ranges have presented considerably problems in the utilization of such speed control systems.

BRIEF SUMMARY OF THE INVENTION

It is an object of this invention to provide a push-button-operated motor speed control system which is relatively compact, economical, reliable and easy to repair or replace.

It is another object of this invention to provide a relatively simple motor speed control system wherein the speed selected is the speed having been attained by the motor at the instant of release of a push button, wherein the amount of increase or decrease in the speed of the motor is determined by the length of time which one or more push buttons are depressed, and wherein any value of speed between preset upper and lower limits is possible.

It is a further object of this invention to provide an electrical control circuit whose output is selectively variable between predetermined upper and lower limits by controllable switch actuations.

It is still a further object of this invention to provide a push-button-operated control circuit for producing a variable output which is directly related to the length of time that a push button is depressed and wherein the steady state level of output is that level having been attained immediately prior to release of the push button.

It is yet another object of this invention to provide a push-button-operated motor drive system for transporting film, tape or other web-like material, bidirectionally, at any desired level of speed between predetermined upper and lower limits.

These and other objects of this invention are accomplished in a push-button-operated motor speed control system by the inclusion of a control circuit employing an FET transistor whose gate is variably biased by controlled variations in the charge on a storage capacitor. Variations in the charge on the capacitor control variations in the conduction of the FET, and variations in the level of an output signal from this FET may be used to control the speed of the motor. Selective switch actuations control the charging or discharging of the gate-biasing storage capacitor, and the increase or decrease in the charge stored on the capacitor is directly related to the closure duration of the selected switch. The steady state level of potential on the capacitor and, hence, the steady state value of the output signal of the control circuit is that value existing substantially at the instant of switch deactuation.

BRIEF DESCRIPTION OF THE DRAWINGS

These and other objects and advantages of the present invention will be apparent to those skilled in the art from the following detailed description of the invention and the appended claims taken in conjunction with the accompanying drawings, in which:

DETAILED DESCRIPTION OF THE INVENTION

The circuit of the present invention may be used in a motor speed control system for providing a required control signal. In addition, the circuit of this invention may be utilized in any application requiring a controllable variation in the circuit output in response to the duration of various switch actuations. Furthermore, this invention may be used in any application requiring that the output of the circuit be controllably variable in response to the length of time one or more selected push buttons are depressed.

Although this invention may be utilized in many different applications for many different purposes, the prime embodiment of this invention, as disclosed herein, relates to the use of this invention to provide a variable control signal in response to the selection and duration of depression of a particular push button in order to control the direction and the speed of rotation of a film drive motor.

Figure 1:
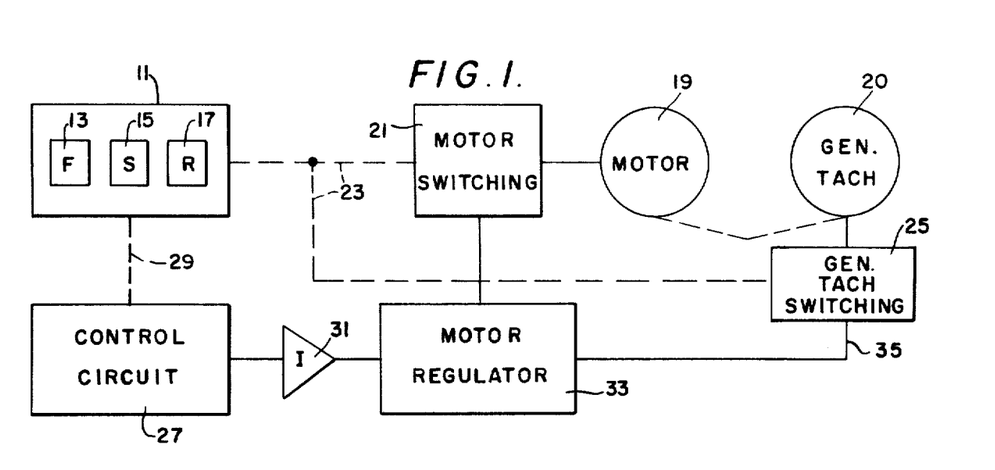
FIG. 1 is a block diagram of a push-button-operated motor speed control system embodying the control circuit of the present invention.

Referring first to FIG. 1, a push-botton-operated switching controller 11 is shown including a forward push button 13, a stop push button 15, and a reverse push button 17. Push buttons 13 and 17 control the direction of operation of the motor 19 through motor switching network 21 which determines the wiring configuration of the leads of motor 19. The dotted line 23 is used to show that the push-button-operated switching controller 11 controls the operation of the motor switching network 21 and the operation of the generator-tachometer switching network 25. The generator-tachometer switching network 25 determines the wiring configuration of the leads of the generator-tachometer 20 for determining the polarity of the feedback signal generated by the generator-tachometer. A variable control signal is generated by control circuit 27 in response to the manipulation of the push buttons 13, 15, 17 of the switching controller 11. The fact that the control circuit 27 is under the control of the push-button-operated switching controller 11 is indicated by the interconnecting dotted line 29. The output of the control circuit 27 is fed to an inverter 31 and the inverted control signal is fed to motor regulator 33. Motor regulator 33 also receives the feedback signal from the generator-tachometer via feedback path 35. A comparison of this feedback signal with the inverted control signal enables motor regulator 33 to control the speed of motor 19 as described hereinafter.

Figure 2:
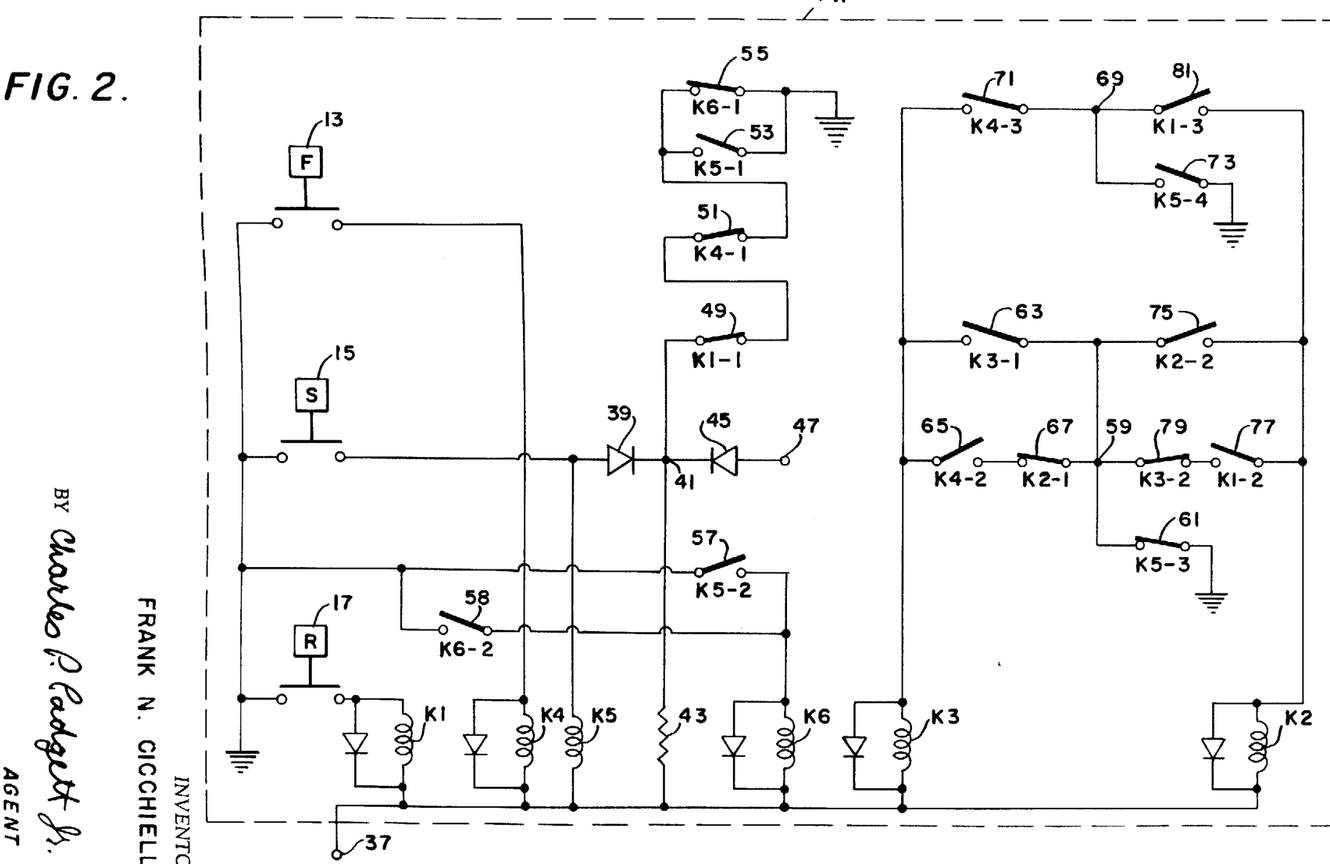
FIG. 2 is a schematic diagram of the push-button-operated switching controller of FIG. 1.

FIG. 2 of the drawings shows the prime embodiment of the push-button-operated switching controller 11 of FIG. 1. In the preferred embodiment, push buttons 13, 15, 17 are of the momentary contact type but other types of push buttons or switch actuation means may be used, as known in the art. This circuit is shown as having a +28 volt source supplied to input 37. Depression of the reverse push button 17 completes a path between the +28 volt source of input 37 and ground through relay K1. Similarly, depression of stop push button 15 will allow the +28 volt source of input 37 a path to ground through relay K5, and depression of push button 13 will close a path between the +28 volt source and ground through relay K4.

The ground side of relay K5 is connected to the anode of a diode 39 whose cathode is connected to junction 41. Junction 41 is connected to the +28 volt source of input 35 through resistor 43 and to the cathode of diode 45 whose anode is connected to a disabling output 47 which will be described hereinafter with reference to FIG. 4. Junction 41 is also connected to ground through a series switching ground return path including normally closed switch 49 of contact K1-1, normally closed switch 51 of contact K4-1, and the parallel combination of normally open switch 53 of contact switch K5-1 and normally closed switch 55 of contact K6-1. Relay K6 is connected between the +28 volt source and ground through the parallel combination of normally open switch 57 of contact K5-2 and the normally open switch 58 of contact K6-2.

The +28 volt source of input 37 may also be connected to ground through relay K3 via junction 59 and normally closed switch 61 of contact K5-3. The ground side of relay K3 may be connected to junction 59 through normally open switch 63 of relay K3-1 or through the series combination of normally open switch 65 of contact K4-2 and normally closed switch 67 of contact K2-1. The ground side of relay K3 may also be connected to a junction 69 through normally open switch 71 of contact K4-3 and junction 69 may be connected to ground through normally open switch 73 of contact K5-4. Similarly, the +28 volt source of input 37 may be connected to ground through relay K2. The ground side of relay K2 may be connected to junction 59 through normally open switch 75 of contact K2-2 or through the series combination of normally open switch 77 of contact K1-2 and normally closed switch 79 of contact K3-2. The ground side of relay K2 may also be connected to the junction 69 through normally open switch 81 of contact K1-3. The operation of push buttons 13, 15, 17 and the relay-operated switches of FIG. 2 controlled by these push buttons will be described hereinafter in relation to the system operation.

The functional diagram of FIG. 3 will be explained with reference to FIG. 1. Generator-tachometer 20 is coupled to motor 19 as indicated by dotted line 83. In the generator-tachometer switching network 25 lead 85 of the generator-tachometer 20 is connected to switch 87 and lead 89 of the generator-tachometer 20 is connected to switch 91. Switch 87 is normally closed on contact K3-3, but the energization of relay K3 will swing switch 87 to contact K3-4. Switch 91 is normally closed on contact K2-3 but may be switched upon the energization of relay K2 to contact K2-4. Contact K2-4 and contact K3-4 are connected to feedback line 93 and contacts K2-3 and K3-3 are connected to feedback line 95.

In the motor switching network 21, lead 97 of the motor 19 is connected to switch 99 which is normally closed on contact K3-5. Switch 99 may be positioned to contact K3-6 upon the energization of relay K3. Lead 101 of motor 19 is connected to switch 103 which is normally closed on contact K2-5 but which closes to contact K2-6 upon the energization of relay K2. Contacts K2-6 and K3-6 are connected to ground while contacts K2-5 and K3-5 are connected to the motor power supply line 105.

Figure 3:
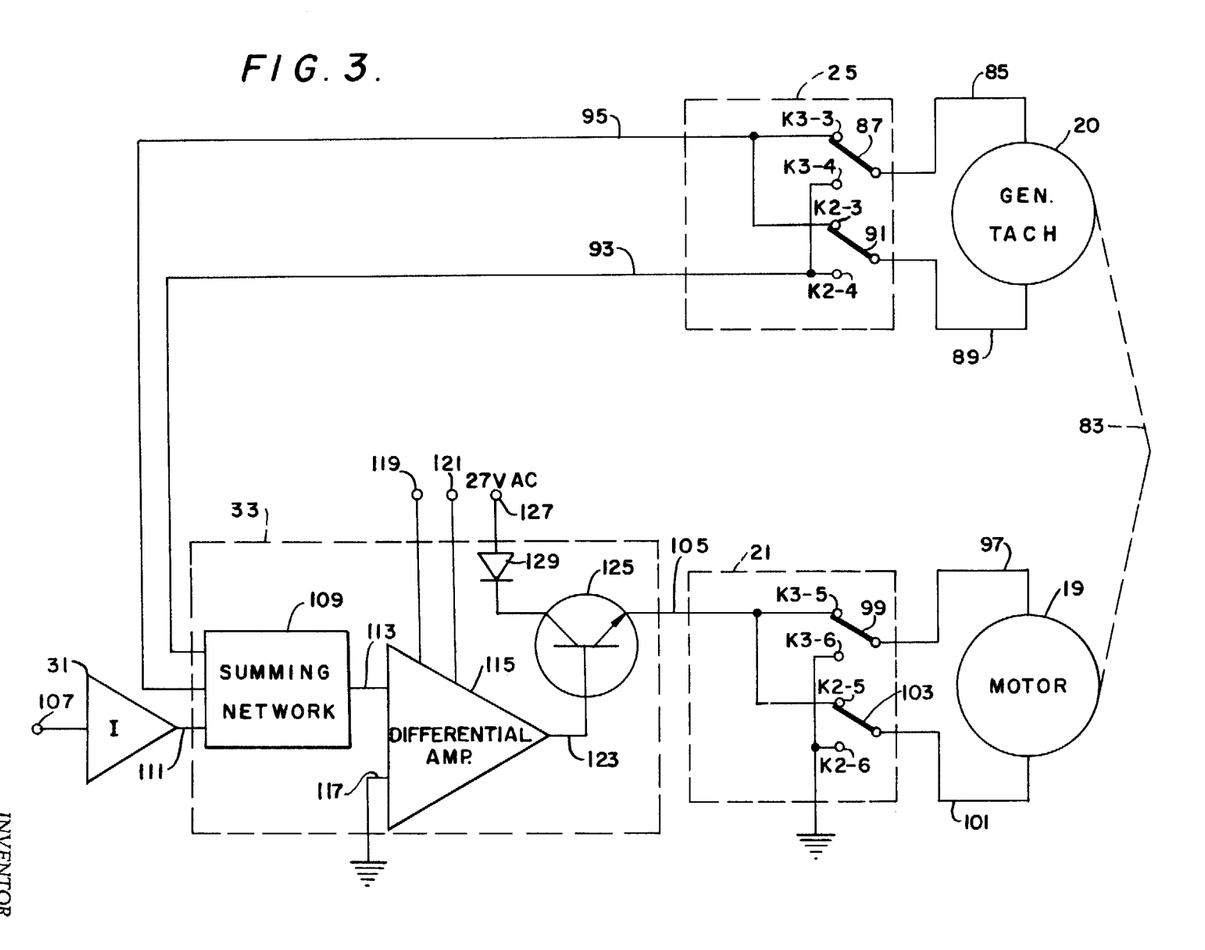
FIG. 3 a functional diagram of the motor switching and generator-tachometer switching networks of FIG. 1 as related to the inverter and motor regulator circuitry of FIG. 1.

The control signal generated by the control circuit 27 of FIG. 1 is fed to the input 107 of the circuits of FIG. 3 and, thence, to inverter 31. Any type of inverter circuit known in the art may be used, such as a polarity reversing, unity gain, operational amplifier or the like. The inverted control signal is fed from the inverter 31 to a summing network 109 via lead 111. Feedback line 93 and feedback line 95 are the other two inputs of the summing network 109. If either feedback signal and the inverted control system are equal, the voltages will cancel and there will be no signal at the output lead 113 of the summing network 109. If, however, the signals do not cancel an error voltage will be generated and fed, via lead 113, to a differential amplifier 115. A second input 117 of differential amplifier 115 is connected to ground and, in the prime embodiment herein disclosed, the differential amplifier 115 is supplied with power from a −28 volt source at input 119 and from a source of +28 volt power at input 121. The error voltage supplied to the differential amplifier will produce a difference signal at output 123. The difference signal at the output lead 123 of the differential amplifier 115 is supplied to the base of a power transistor 125 and variations of this voltage will control the level of power supplied to the motor 19 by controlling the conduction between the 27 volt AC source of input 127 and the motor power supply lead 105 which are connected through diode 129 and the current-carrying electrodes of power transistor 125.

Figure 4:
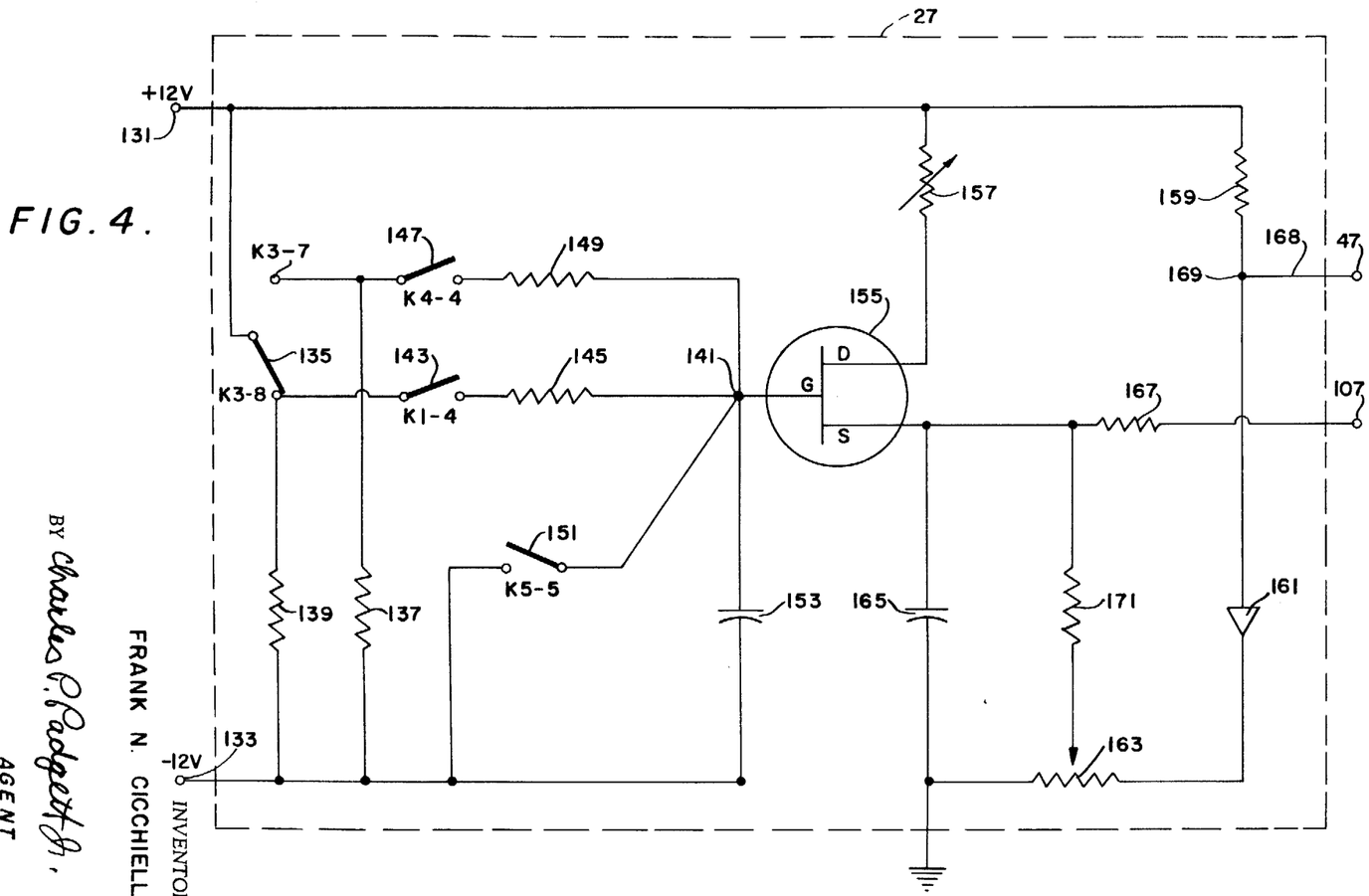
FIG. 4 is a schematic diagram of the control circuit of the present invention, and FIGS. 5($a$) – ($d$) show a series of plots of the output voltage of the circuit of FIG. 4 vs. time for various periods of depression of the selected push button.
Figure 5:
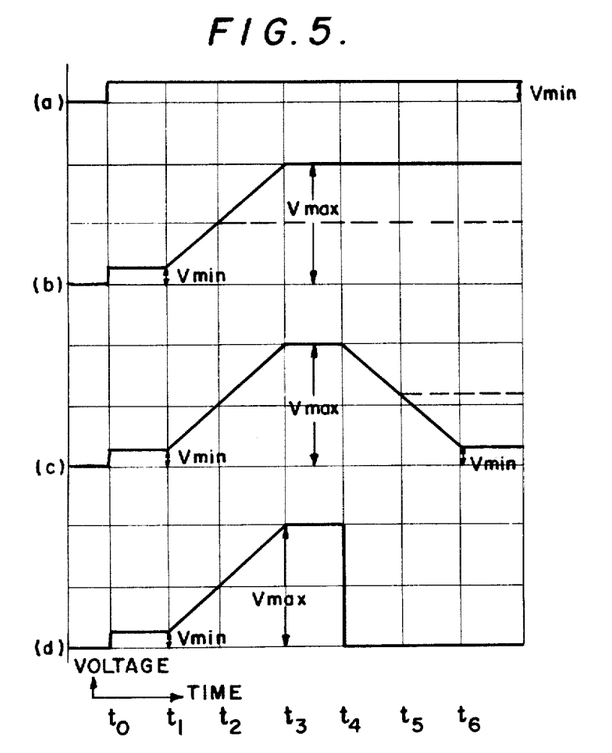

Referring now to FIG. 4 of the drawings, which illustrates a schematic diagram of the control circuit 27 of the system of FIG. 1, input 131 is supplied from a source of positive potential, such as +12 volts in the preferred embodiment described herein, and input 133 is supplied from a source of negative potential, such as −12 volts. Switch 135, which is under the control of the push-button-operated switching controller 11 of FIG. 2, may be used to connect input 131 to either contact K3-7 or contact K3-8, the normal position of switch 135 being closed upon contact K3-8. Contact K3-7 is connected to the −12 volt source of input 133 through resistor 137 and contact K3-8 is connected to the −12 volts source of input 133 through resistor 139. Switch 135 normally connects the +12 volts source of input 131 to junction 141 through the series combination of normally open switch 143 of contact K1-4 and resistor 145. When relay K3 is energized, switch 135 closes on contact K3-7 and the +12 volts source of input 131 may be applied to the junction 141 by the closure of normally open switch 147 of contact K4-4 and resistor 149.

Switch 151, also under the control of the switching controller 11 of FIG. 2, may be operated to connect junction 141 to the −12 volts source of input 133, thereby bypassing charging capacitor 153 which is connected between junction 141 and the −12 volts source of input 133. The charge stored on charging capacitor 153 supplies a biasing potential to junction 141 and this potential is applied to the gate of FET transistor 155. The drain of FET transistor 155 is coupled to the +12 volts source of input 131 through variable resistor 157. Input 131 is also coupled to ground through minimum speed control circuitry comprising resistor 159, diode 161 and potentiometer 163. One terminal of potentiometer 163 is connected to the cathode of diode 161 and the other terminal of potentiometer 163 is connected both to ground, and through capacitor 165, to the source terminal of FET transistor 155. The source terminal of FET 155 is also connected through resistor 167 to the circuit output 107 and to potentiometer 163 through the adjustable potentiometer arm, resistor 171. A disabling output 47 is taken from a junction 169 between resistor 159 and the anode of diode 161. This output is connected to junction 41 of the circuit of FIG. 2, as heretofore mentioned, for providing a ground path for junction 169 and effectively disabling the potentiometer portion of the circuit.

The operation of the motor speed control system of this invention will first be described for the forward operation of the motor and reference will be made to FIGS. 1–5. For the purpose of explanation, it will be assumed that the motor 19 is initially at rest. Power may be applied to the system in any suitable manner, such as by the activation of a power-on, power-off, switch which energizes the various power sources of the system. The application of power to the circuits of this system establishes an initial electrical state wherein the control circuits of the system are disabled. This initial electrical state is established as described below.

Initially, a ground return path exists between the input 37 of the circuit of FIG. 2 and ground through the series connection of relay coil K5, and diode 39, this diode having its anode connected to the relay K5 and its cathode connected to grounded junction 41. The junction 41 is initially grounded through a series switching ground return path comprising normally closed switch 49 of contact K1-1, normally closed switch 51 of contact K4-1, and the closed switch of the parallel combination of normally closed switch 55 of contact K6-1 and normally open switch 53 of contact K5-1. Hence, the energization of the +28 volt source of input 37 will cause a current to flow through the relay K5 which lies between input 37 and ground, and the energization of relay K5 will close the normally open switch 53 of contact K5-1 thereby latching relay K5 in the energized state by maintaining the series switching ground return path from junction 41.

The energization of relay K5 also closes the normally open switch 151 of contact K5-5 of the circuit of FIG. 4 and allows the −12 volts source of input 133 to be applied to the gate of FET transistor 155 via junction 141. This insures that the FET transistor 155 remains in a non-conductive or disabled state. The circuit of FIG. 4 also includes a minimum speed control portion, including resistor 159, diode 161 and potentiometer 163. The adjustable arm of potentiometer 163, resistor 171, provides a means for presetably establishing a minimum speed control level of voltage at the output 107 of the circuit of FIG. 4. This minimum speed control circuitry is also disabled when the initial electrical state is established.

As with the disabling of FET transistor 155, the diabling of the minimum speed control circuitry is triggered by the energization of relay K5 and the resulting establishment of the series switching ground return path of junction 41. A junction 169 exists between the resistor 159 and the anode 161 of the above-described minimum control circuitry. The junction 169 is connected to the junction 41 via lead 168 and disabling terminal 47 of the circuit of FIG. 4. The disabling terminal 47 of the circuit of FIG. 4 is shown by the same reference numberal on the circuit of FIG. 2 and is connected to the anode of diode 45 whose cathode is connected to junction 41. Since the energization of relay K5 results in the closure of switch 53 and the latched grounding of junction 41, the junction 169 is clamped at a potential of a few tenths of a volt above ground. When the junction 169 is thus clamped, the +12 volts source of input 131 is effectively decoupled from the potentiometer portion of the circuit and the minimum speed control circuitry is effectively disabled.

Once relay K5 has been energized, normally open switch 57 of contact K5-2 is closed and a path is provided between the +28 volts source of input 37 and ground through relay K6. Relay K6 is energized causing a closure of normally open switch 58 of contact K6-2 and the opening of normally closed switch 55 of contact K6-1. Relay K6 is latched in the energized state once switch 58 has been closed.

Hence, as soon as the various power supplies of the motor speed control system are activated, relay K5 and relay K6 are energized and latched in the energized state. The latching of relay K5 disables circuit 27 of FIG. 4 by maintaining FET transistor 155 in a non-conductive state and disables the minimum speed control portion of that circuit by effectively grounding junction 169. This initial electrical state of the motor speed control system of this invention is automatically established by activation of the power sources or, as described hereinafter, by the momentary depression of stop push button 15, and the circuit awaits the operator's choice of motor speed and direction. As indicated previously, the operation of the circuits of this system will first be described for the forward operation of the motor 19.

Consider first the effect of a momentary depression of forward push button 13 on the push-button-operated switching controller of FIG. 2. This momentary depression completes a ground return path from the +28 volts source of input 37 to ground through relay coil K4. This results in a momentary energization of relay K4 which opens the normally closed switch 51 of contact K4-1. The momentary opening of switch 51 of contact K4-1 breaks the series switching ground return path of junction 41, thereby unlatching and de-energizing the relay K5. The de-energization of relay K5 allows switch 151 of contract K5-5 of the circuit of FIG. 4 to open thereby disconnecting the junction 141 from the FET disabling −12 volts source of input 133.

The momentary depression of forward push button 13 also operates to enable the minimum speed control portion of the circuit of FIG. 4. A momentary energization of relay K4 and the ensuing momentary opening of switch 51 of contact K4-1 causes the unlatching and the de-energization of relay K5 which results in the opening of switch 53 of contact K5-1. The ground return path which existed between the junction 169 and ground via lead 158, disabling output terminal 47, diode 45 and the series switching ground return path of junction 41 is broken. Hence, the junction of 169 is no longer clamped at the few tenths of a volt above ground and the +12 volts source of input 131 is applied to the minimum speed control portion of the circuit of FIG. 4 which includes resistor 159, diode 161 and potentiometer 163. One end of potentiometer 169 is, therefore, coupled to this source of power through the cathode of diode 161 and the other end of the potentiometer is grounded. Hence, the arm of potentiometer 163, resistor 171, may be variable adjusted to supply a preselected minimum level of control voltage to the output 107.

FIGS. 5(a)–(d) show a series of plots of the voltage at the output 107 of the circuit of FIG. 4 versus time for various depression durations of a selected push button. FIG. 5(a) shows the effect of a momentary depression of forward push button 13. At time $t_0$, the foward push button 13 is momentarily depressed and the output voltage quickly goes from zero to the preselected minimum speed control voltage level, labeled $V_{min}$, which is generated by the minimum speed control portion of the circuit of FIG. 4, as described above.

The momentary depression of forward push button 13 and the resulting de-energization of relay K5 will also complete a ground return path between the +28 volts source of input 37 and ground through relay coil K3, the normally open but momentarily closed switch 65 of contact K4-2, the normally closed switch 67 of contact K2-1 and the normally closed switch 61 of contact K5-3. When relay K3 is energized, the normally open switch 63 of contact K3-1 is closed and relay K3 is latched causing the leads of the drive motor 19 and the leads of the generator-tachometer 20 to be connected so that the motor runs in the forward direction and so that a proper polarity feedback signal is generated.

Energization of the relay K3 positions switch 87 of the generator-tachometer switching network 25 of the circuit of FIG. 3 to contact K3-4 and the switch 99 of the motor switching network 21 to contact K3-6. Lead 97 of the motor 19 is, therefore, connected to the grounded contact K3-6 and the lead 101 of the motor 19 remains connected via switch 103 to the contact K2-5 which connects to the power supply lead 105. As indicated above, the leads of the generator-tachometer 20 are connected so that the lead 85 is connected to feedback line 93 through switch 87 which is positioned to contact K3-4 by the energization of relay K3 and the lead 89 is connected to feedback line 85 through switch 91 which is normally closed on contact K2-3. Since the motor is initially stopped, there is no feedback signal present on the feedback lines 93, 95 and, hence, no feedback signal is applied to the summing network 109. The minimum speed control signal, $V_{min}$, which is present at the output 107 of the control circuit of FIG. 4, is supplied to an inverter 31, and the inverted control signal is applied to the summing network 109 via lead 111. Since there is no signal present on feedback lines 93 and 95, an error signal is generated at the output of the summing network and this error signal is fed to a differential amplifier 115 via lead 113. The differential amplifier 115 generates a difference signal and this difference signal is applied to the base of a power transistor 125 via lead 123. Variations in the level of difference signal applied to the base of the power transistor 125 vary the conduction of power from the 27v AC source of input 127 to the motor power supply lead 105 by controlling the conduction of current between the current-carrying electrodes of power transistor 125.

Assume now that the period of depression of the forward push button 13 is of more than a momentary duration. Initially, the circuit will function as previously described for a momentary depression, with the leads of the motor 19 being connected for forward operation and the leads of the generatortachometer 20 being connected to provide the proper polarity feedback signal. The de-energization of relay K5, as described previously, allows switch 151 of contact K5-5 to return to its normally opened position thereby removing the FET disabling −12 volts source of input 133 from the gate of FET transistor 155 and opening the ground return path of junction 169 thereby enabling the minimum speed control portion of the circuit of FIG. 4.

The energization of relay K3 will also cause switch 135 to close on contact K3-7. Since the period of depression of the forward push button 13 controls the period of energization of relay K4 and, hence, the duration of closure of switch 147 of contact K4-4, the length of time which the forward push button 13 is held depressed controls the length of time during which capacitor 153 is charged from the +12 volts source of input 131 via resistor 149. Resistor 149 and capacitor 153 form an RC charging network which is used to increase the positive voltage applied to the gate of the FET transistor 155 as a function of the length of time that voltage is applied to the resistor 149. The longer the forward push button 13 is depressed and, therefore, the longer the switch 147 remains closed, the higher the level of charge stored on the capacitor 153 and the more positive the voltage at junction 141.

A mere momentary actuation of the forward push button 13, however, will not charge the capacitor 153 sufficiently to allow the junction 141 to go positive, hence, the FET transistor 155 will not switch to a conductive state. Assuming a longer period of depression of the push button 13, higher levels of speed control voltage may be obtained, as shown on FIG. 5(b). If forward push button 13 is depressed at time $t_0$, a minimum control voltage level, $V_{min}$, will appear at the output 107, as indicated previously. This level will continue at the output 107 until junction 141 begins to go positive as the capacitor 153 is charged through resistor 149 and the closed switch 147. At time $t_1$, the junction 141 goes positive and this positive voltage is applied to the gate of FET transistor 155, biasing it to a conductive state.

During the time interval between $t_1$ and $t_3$, the FET conducts and the level of the control voltage at the output 107 is directly related to the length of time that the switch 147 remains closed, hence, directly related to the length of time that the forward push button 13 is held depressed, since the level of the control voltage at output 107 is controlled by the conduction of the FET and the conduction of the FET is controlled by the biasing potential at its gate. The biasing potential is a function of the charge stored on the capacitor 153 and the charge is substantially linearly variable over the range of values between $t_1$ and $t_3$, the linear variations being directly related to the length of time that forward push button 13 is held depressed.

Assuming that the desired motor speed is reached at time $t_2$, the release of forward push button 13 opens switch 147 and the charging of capacitor 153 terminates. The capacitor 153, due to the high input impedence of the FET 155, retains its charge and, hence, the level of biasing potential present at the gate of FET transistor 155 remains constant and the conduction of the FET continues at the level which existed immediately prior to the release of the forward push button 13. Therefore, the level of control voltage appearing at the output 107 and, hence, the speed of the motor, remains at a constant level, as indicated by the horizontal dotted line beginning at time $t_2$ in the voltage diagram of FIG. 5(b).

Assuming that a still higher motor speed is desired, the forward push button 13 is held depressed for an even longer period of time and an even greater charge is allowed to build on capacitor 153. At some point, such as at time $t_3$ on the voltage diagram of FIG. 5(b), a maximum control voltage level $V_{max}$ will be reached. This maximum control voltage level may be preset by adjusting variable resistor 157 to the desired value. Once the desired motor speed is reached, whether it be controlled by maximum control voltage level having been attained at time $t_3$, or some intermediate value of speed, such as that speed corresponding to a control voltage level having been attained at time $t_2$, the control voltage level and the motor speed corresponding thereto will be maintained after the release of forward push button 13 for a substantial period of time, for example one hour or more, due to the fact that the charge on capacitor 153 will not be readily drained due to the high input impedence of the FET transistor 155.

Assume now that the motor is being operated in the forward direction and that the speed of the motor corresponds to the level of control voltage present at output 107. Assume further, for the sake of simplicity, that the motor is being operated at its maximum speed, i.e., at that value of motor speed corresponding to the maximum control voltage level $V_{max}$. Now, if the operator desires to slow the operating speed of the motor, he may do so by pressing and holding the reverse push button 17. The depression of push button 17 will slow the speed of the motor in proportion to the length of time that the push button 17 is held depressed. When the desired speed is attained, reverse push button 17 may be released and the charge remaining on capacitor 153 will insure that the motor continues to run at this newly selected speed.

When the reverse push button 17 is depressed and held, a path is completed between the +28 volts source of input 37 and ground through relay coil K1. The period of energization of relay K1 is therefore controlled by the period of depression of reverse push button 17 and the period of energization of relay K1 determines the length of time that switch 143 remains closed on contact K1-4. The closing of switch 143 of contact K1-4 completes a path between junction 141 and the −12 volts source of input 133 via resistor 145, the closed switch 143 of contact K1-4, and resistor 139, switch 135 being latched on contact K3-7. Control over the closure duration of switch 143 of contact K1-4 allows the operator to control the discharging of the capacitor 153 and, therefore, to control the level of voltage at junction 141 and, hence, the conduction of FET transistor 155.

FIG. 5(c) shows a voltage diagram of the voltage at output 107 of the circuit of FIG. 4 versus time for a situation wherein the level of the control signal attains its predetermined maximum value at time $t_3$ is maintained at that level until time $t_4$. At time $t_4$, the operator desires to reduce the forward speed of the motor and the reverse push button 17 is depressed. This allows the discharging of the capacitor 153 to be substantially linearly controlled by the closure duration of switch 143. This results in a reduction in the level of control voltage at the output 107 which in turn results in a slowing of the motor 19. When the desired motor speed has been attained, for example, at time $t_5$, the release of the reverse push button 17 will de-energize relay K1, thereby opening switch 143 of contact K1-4. The capacitor 153 will maintain its present charge and the voltage at junction 141 will remain constant, therefore, the level of the control signal at output 107 will be maintained at this newly selected level, as illustrated by the horizontal dotted line originating at time $t_5$ on the voltage diagram of FIG. 5(c). If, however, the desired motor speed has not yet been attained, reverse push button 17 will be held depressed until the desired level of speed is attained or until the minimum speed control voltage level, $V_{min}$, is attained at time $t_6$. Continued depression of push button 17, after the minimum control voltage level has been reached, will not operate to further reduce the speed of the motor below its preselected minimum speed.

The preceding description of the forward operation of the motor has shown the means by which the level of the control signal and the corresponding forward speed of the motor may be controllably varied to any of an infinite number of values between preselected upper and lower limits.

Consider now a situation wherein the operator desires to stop the rotation of the motor 19 in order to terminate his use of the system or to reverse the direction of operation of motor 19. All that is needed to stop the motor is a momentary depression of stop push button 15 which completes a ground return path from the +28 volts source of input 37 through relay K5. The energization of relay coil K5 closes the switch 53 of contact K5-1, thereby completing another ground return path from the +28 volt source of input 37, and through relay K5 to the junction 41 which is connected to ground through the series switching ground return path comprised of normally closed switch 49 of contact K1-1, normally closed switch 51 of contact K4-1, and normally open but now closed, switch 53 of contact K5-1. The completion of this ground return path latches the relay coil K5 in the energized state. This disables the minimum speed control portion of the circuit of FIG. 4 since junction 169 is clamped at a potential of a few tenths of a volt above ground due to the connection between the junction 169 and the now-grounded junction 41 through lead 168, disabling terminal 47 and diode 45.

The FET transistor 155 is similarly disabled by the momentary depression of push button 15. The energization of relay K5 causes normally open switch 151 to close on contact K5-5 and allows the −12 volt disabling source of input 133 to be applied to the gate of FET transistor 155 thereby switching the FET to a non-conductive state disabling the control circuit of FIG. 4 and discharging the capacitor 153.

The momentary energization of stop push button 15 and the resulting latched energization of relay K5 in addition to disabling the above-described minimum speed control circuitry and the FET transistor 155 of the circuit of FIG. 4, also operates to ready the circuit for controlled operation in the opposite direction. The energization of relay K5 causes switch 61 of contact K5-3 to open and the ground return path of relay K3 is broken, thereby electrically delatching the relay K3. The de-energization of relay K3 causes switch 99 of the motor switching circuit 21 to be repositioned to contact K3-5, thereby shorting the leads 97, 101 of the motor 19 through switch 99, contact K3-5, contact K2-5 and switch 103. With the leads of the motor shorted together, the motor 19 is dynamically braked due to the short and to the back EMF generated by the coasting armature thereby allowing the motor to stop in as short a time as is possible. The de-energization of relay K3 will also short the leads 85, 89 of the generator-tachometer 20 since the switch 87 of the generator-tachometer switching circuit 25 is repositioned to contact K3-3 upon the de-energization of relay K3, thereby completing a path between lead 85, switch 87, contact K3-3, contact K2-3, switch 91 and lead 89 and preventing the generation of further feedback signals.

FIG. 5(d) depicts a situation wherein the forward push button 13 is depressed at time $t_0$ and is held depressed until time $t_3$. At this time, the maximum control level $V_{max}$ is attained and this level is maintained until time $t_4$. At time $t_4$, the stop push button 15 is momentarily depressed and, due to the disabling of the minimum speed control circuitry and the FET transistor 155 of the circuit of FIG. 4, the level of the control signal present at output 107 is quickly reduced to zero.

The operation of the motor 19 in the opposite direction will now be considered. Since motor operation in the reverse direction can be commenced only after an initial power energization or after a momentary depression of stop push button 15, as described above, the relay K5 is initially energized and latched by the completion of the ground return path from the +28 volt source of input 37, through the relay coil K5 and the diode 39 to junction 41 and thence to ground through the series switching ground return path comprising normally closed switch 49 of contact K1-1, normally closed switch 51 of contact K4-1, and normally open, but currently closed switch 53, of contact K5-1. The energization of relay K5 assures that FET transistor 155 is initially non-conductive since the gate of the FET is supplied from the −12 volt source of input 133 via closed switch 151 of contact K5-5 and junction 141. Similarly, as mentioned above, the minimum speed control portion of the circuit of FIG. 4 is disabled since the completion of the series switching ground return path of junction 41 maintains the junction 169 at a few tenths of a volt above ground and effectively disables the minimum speed control portion of the circuit of FIG. 4.

A momentary depression of the reverse push button 17 completes a ground return path between the +28 volt source of input 37 and ground through relay coil K1. The energization of relay K1 activates switch 49 of contact K1-1 thereby breaking the series switching ground return path of junction 41, enabling the minimum speed control portion of the circuit of FIG. 4, and the electrically delatching relay K5. The de-energization of relay K5 opens switch 151 of contact K5-5 and closes switch 61 of contact K5-3. Therefore, the energization of relay coil K1 closes switch 77 of contact K1-2 and completes a ground return path between the +28 volt source of input 37 and ground through relay coil K2, the now-closed switch 77 of contact K1-2, normally closed switch 79 of contact K3-2, junction 59 and the now-closed switch 61 of contact K5-3. This energizes relay K2 and closes switch 75 of contact K2-2, thereby electrically latching the relay K2 in the energized state.

The energization of relay K2 causes the motor switching circuit 21 to position of leads 97, 101 of motor 19 for reverse operation. Switch 103 is positioned to contact K2-6 thereby connecting lead 101 to ground, the lead 97 remains connected to the power supply lead 105 via switch 99 which remains positioned to contact K3-5. Similarly, the generator-tachometer switching circuit 25 positions the leads 85, 89 of generator-tachomer 20 such that the lead 85 remains connected to contact K3-3 of feedback line 95 and the lead 89 is positioned through switch 91 and contact K2-4 to feedback line 93. The motor 19 is, therefore, connected for reverse operation, and the generator-tachometer 20 is wired so as to provide a proper polarity feedback signal.

Increases in the speed of motor 19 during reverse operation are controlled by the operation of reverse push button 17 in the same manner as increases in the forward speed of the motor were controlled by the operation of forward push button 13. The +12 volt source of input 131 is connected to contact K3-8 by switch 135 and the operation of reverse push button 17 controls the operation of switch 143 of contact K1-4, hence, the charging of the capacitor 153 through resistor 145. The controlled slowing of the motor is controlled by the depression of forward push button 13 which operates switch 47 of contact K4-4 to controllably discharge capacitor 153 through the −12 volt source of input 133 via resistors 149 and 137. Therefore, the slowing of the motor while operating in the reverse direction is controlled by the operation of forward push button 13 in much the same manner as the slowing of the motor while operating in the forward direction is controlled by the operation of reverse push button 17, as described previously.

The following component values have been found to be suitable for use in the illustrated embodiment of this invention:

| Transistor | 125 | 2N3055 |
|---|---|---|
| FET Transistor | 155 | IN 3970 |
| Potentiometer | 163 | 1 |
| Variable Resistor | 157 | 1 |
| Capacitor | 153 | 0.68−75V |
| Capacitor | 165 | 25−25V |
| Diode | 39 | IN 4003 |

| -Continued | | |
|---|---|---|
| Diode | 45 | IN 914 |
| Diode | 161 | IN 914 |
| Diode | 177 | IN 4001 |
| Resistor | 43 | 33 |
| Resistor | 137 | 10 |
| Resistor | 139 | 10 |
| Resistor | 145 | 2200 |
| Resistor | 149 | 2200 |
| Resistor | 159 | 10 |
| Resistor | 167 | 10 |
| Resistor | 171 | 1 |

All values of resistance are given in K-ohms, + or − 5%, one-fourth W. All values of the capacitance are given in microfarads.

The above-listed component values and the voltage levels given in the description and the drawings are for illustrative purposes only and, as is clear to one skilled in the art, many other choices of both are available. It should also be clear that the specific circuit configuration shown and the system in which it is used are given by way of example only and are not to be construed as limitations on the scope of the present invention which is limited only by the appended claims.

I claim:

1. A motor speed control system for controlling current flow to a motor comprising:
   current-control means including two current-carrying electrodes, and a control electrode having substantially complete current flow isolation with respect to said current-carrying electrodes, said current-control means being coupleable to the motor for controlling current flow to the motor as the function of a voltage level upon said control electrode;
   means coupleable to the motor for providing a settable minimum current flow level to the motor;
   a capacitor connected to said control electrode for controlling the voltage level on said control electrode in proportion to the charge on said capacitor;
   first manually operable means having a controllable duration of actuation for charging said capacitor, the charging of said capacitor being directly proportional to the duration of actuation of said first manually operable means; and
   second manually operable means having a controllable duration of actuation for discharging said capacitor, the discharging of said capacitor being directly proportional to the duration of actuation of said second manually operable means.

2. The motor speed control system of claim 1, wherein said current-control means further includes means for providing a settable maximum current flow level to the motor, and means for insuring a linear control of current flow to the motor between said maximum and said minimum current flow levels.

3. The motor speed control system of claim 1, wherein said current control means includes an FET transistor, said control electrode includes the gate electrode of said FET transistor, one of said current-carrying electrodes includes the drain of said FET transistor, and the other of said current-carrying electrodes includes the source of said FET transistor.

4. The motor speed control system of claim 1, which further includes:
   means coupled to said minimum current flow level means for disabling said minimum current flow level means; and
   discharging means coupled to said control electrode for substantially immediately discharging said capacitor.

5. The motor speed control system of claim 4, which further includes:
   a first switching element having a duration of actuation controlled by said first manually operable means;
   a second switching element having a duration of actuation controlled by said second manually operable means; and
   third manually operable means for controlling said discharging means and said means for disabling said minimum current flow level means.

6. The motor speed control system of claim 5, wherein said first, second, and third manually operable means include first, second and third pushbuttons and relay coils, respectively; the period of depression of said first and second pushbuttons controlling the energization of said first and second relay coils for determining the duration of actuation of said first and second switching elements, respectively; and any depression of said third pushbutton being operable to energize said third relay coil for controlling said switching means and said means for disabling said minimum current flow means.

7. The motor speed control system of claim 3, wherein said means for providing a settable maximum current flow level to the motor includes variable resistive means coupled to the drain of said FET for adjustably limiting current flow thereto.

8. The motor speed control system of claim 1, wherein said means for providing a settable minimum current flow level to the motor includes a voltage divider, said voltage divider including a potentiometer for setting said minimum current flow level, and said potentiometer including a wiper connected to the source of said FET.

9. The motor speed control system of claim 8, wherein said means for disabling said means for providing a minimum current flow level to the motor includes means for effectively decoupling said power source from said voltage divider, said decoupling means including:
   a diode having its anode connected to one end of said voltage divider; and
   normally open switching means connected to the cathode of said diode, said switching means being closable for completing a path to the other end of said voltage divider.

* * * * *